United States Patent [19]

Du Bois

[11] 4,020,547

[45] May 3, 1977

[54] POLARIZING KEY INSERTION TOOL

[75] Inventor: Edward F. Du Bois, Binghamton, N.Y.

[73] Assignee: The Singer Company, Binghamton, N.Y.

[22] Filed: July 28, 1975

[21] Appl. No.: 599,724

[52] U.S. Cl. .................................... 29/629; 29/747

[51] Int. Cl.$^{2}$ ......................................... H02G 15/00

[58] Field of Search ..... 29/203 B, 203 H, 203 HM, 29/203 P, 203 J, 629, 203 S, 628, 630 R, 630 B, 630 C, 630 D

[56] References Cited

UNITED STATES PATENTS

| | | | |
|---|---|---|---|
| 3,535,763 | 10/1970 | Helton | 29/203 H |
| 3,640,519 | 2/1972 | Halstead | 29/203 H X |
| 3,699,629 | 10/1972 | Hood et al. | 29/203 H |
| 3,875,636 | 4/1975 | Shultz et al. | 29/203 B |

*Primary Examiner*—James R. Duzan
*Attorney, Agent, or Firm*—James F. Duffy; James C. Kesterson

[57] ABSTRACT

A polarizing-key insertion tool for facilitating insertion of polarizing keys into backplate and card bin printed circuit board connectors is disclosed.

3 Claims, 3 Drawing Figures

POLARIZING KEY INSERTION TOOL

BACKGROUND OF THE INVENTION

1. Field of the Invention

The invention relates to printed circuit connectors in general and particularly to those connectors which must be polarized by means of a polarizing key to prevent the inadvertent insertion therein of printed circuit boards which would not function or might be damaged if mated with the wrong connector.

2. Description of the Prior Art

Printed circuit (p.c.) board edge receptacle connectors are well known in the art. Electrical conductors for various circuit elements on the p.c. board are located along an edge of the board. When the board is inserted into a receptacle connector, spring fingers within the connector make contact with the conductors on the p.c. board.

There is industry-wide standardization of p.c. board thickness, and contact width and spacing. Because of this standardization, it is possible to insert p.c. boards, each having different circuit elements and function, into the same p.c. board connector. If a p.c. board is inadvertently inserted into the wrong connector in an operating system, the board may be destroyed, for all practical purposes, and/or other faults may be engendered elsewhere in the system.

To overcome this potential problem, the typical p.c. board receptacle connector is capable of being keyed to prevent improper insertion of the wrong p.c. board in any given receptacle. Provision for keying usually takes the form of grooves between pairs of spring finger connectors, into which a polarizing key is inserted. Polarization is achieved by placing a cut-out, or slot at the edge of the p.c. board, which slot will accept the polarzing key when the board is inserted into its proper receptacle. Should an attempt be made to mis-mate a board and a receptacle, an interference results and insertion of the board is prevented.

Polarizing keys are relatively small items having dimensions on the order of 0.40 inches long, by 0.10 inches wide, by 0.3 inches thick.

Emplacement of this small device within the proper grooves in the receptacle connector is most commonly performed by manual operations which are error prone and time consuming. Typically, a needle-nose pliers or similar tool is used to grasp the polarizing key and insert it into the connector. Common errors comprise mis-placement of the key by insertion in the wrong location or mis-alignment of the key such that it is not everywhere equidistant from the spring fingers on either side. In the latter case, the cocked key prevents insertion of the p.c. board, even though the key is located at its assigned position within the receptacle.

These problems are inherent in such manual operations when the polarizing keys are inserted in the receptacles as a bench procedure. The task becomes even more tedious and prone to error in final assembly stages at which keys are inserted in receptacles in deep card bins or drawers or cabinets, or when a change is required in equipment operating in the field where interior cabinet areas may be dimly lit and have poor receptacle accessibility.

Another factor contributing to errors in locating the key in a receptacle is that the markings on the receptacle are small and difficult to read and do not relate directly to polarizer key location numbers.

The invention was conceived with the objects of simplifying emplacement of polarizer keys in p.c. board receptacle connectors, reducing the error rate, increasing productivity, and providing an easy means of locating and inserting the keys accurately regardless of whether the operation was performed at bench level assembly or at rack or drawer level.

SUMMARY OF THE INVENTION

A hand tool is disclosed which mates with a p.c. board connector in the same manner as does the p.c. board itself. Easy to read index number markings are provided along the mating edge of the tool. Means to readily accept and then retain a polarizer key at any indexed location are employed. A squeeze handle on the tool, when operated, ejects the polarizer key.

In use, a polarizer key is inserted manually in the tool at any desired indexed location; the tool inserted in the p.c. board connector; the squeeze handle operated to eject the polarizer key; and the tool withdrawn, leaving the polarizer key in the connector, properly located and aligned.

DESCRIPTION OF THE INVENTION

The invention is a hand tool meant to be mated with a p.c. board connector and operated so as to conveniently and accurately insert a polarizing key in the connector at a desired location. The invention may assume the form illustrated in FIG. 1. When handle G is compressed against the body of the tool, a polarizing key, retained by spring fingers E, will be ejected. Springs H return handle G to its normal position.

Figure 1:
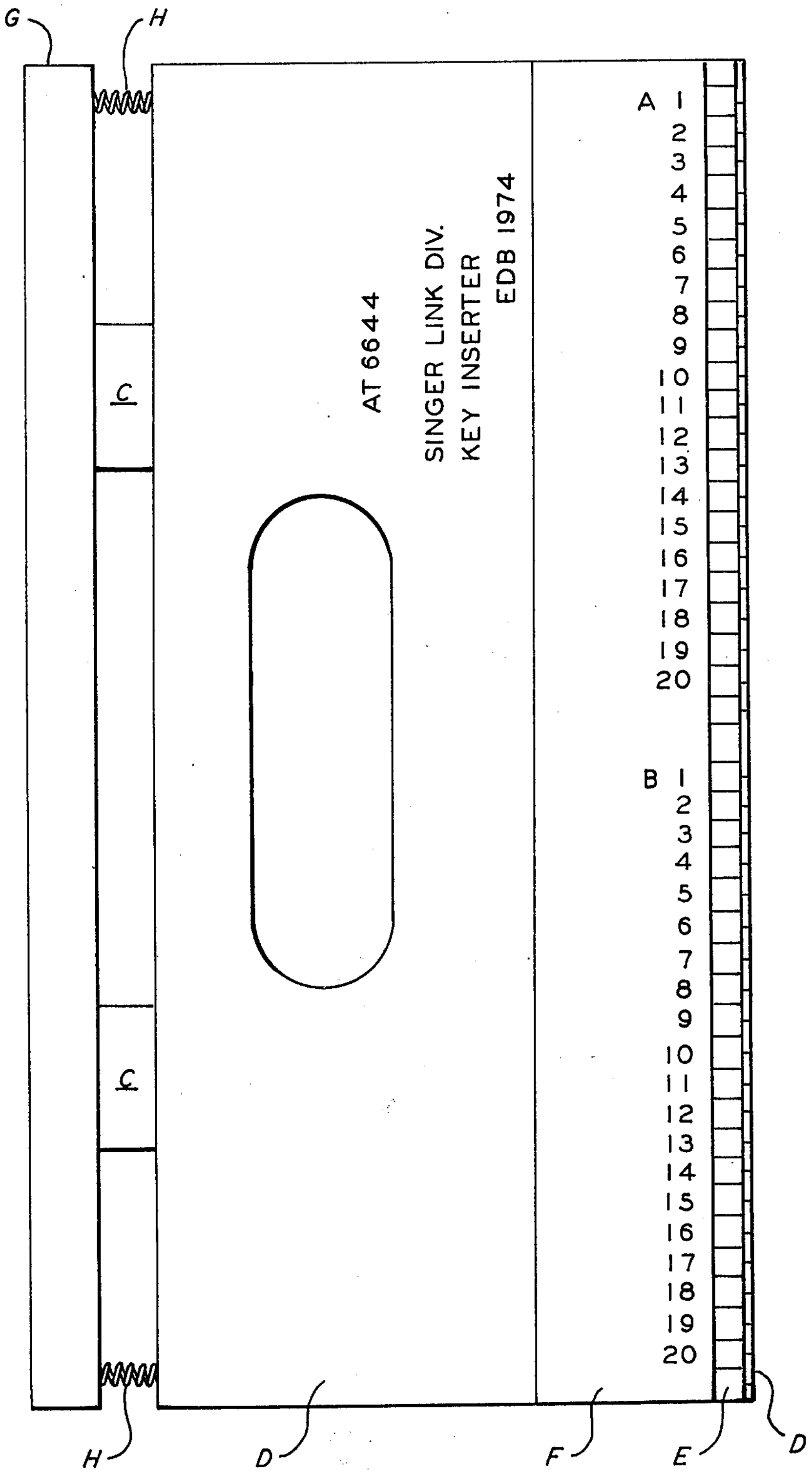
FIG. 1 illustrates one form the invention may take.
Figure 2:
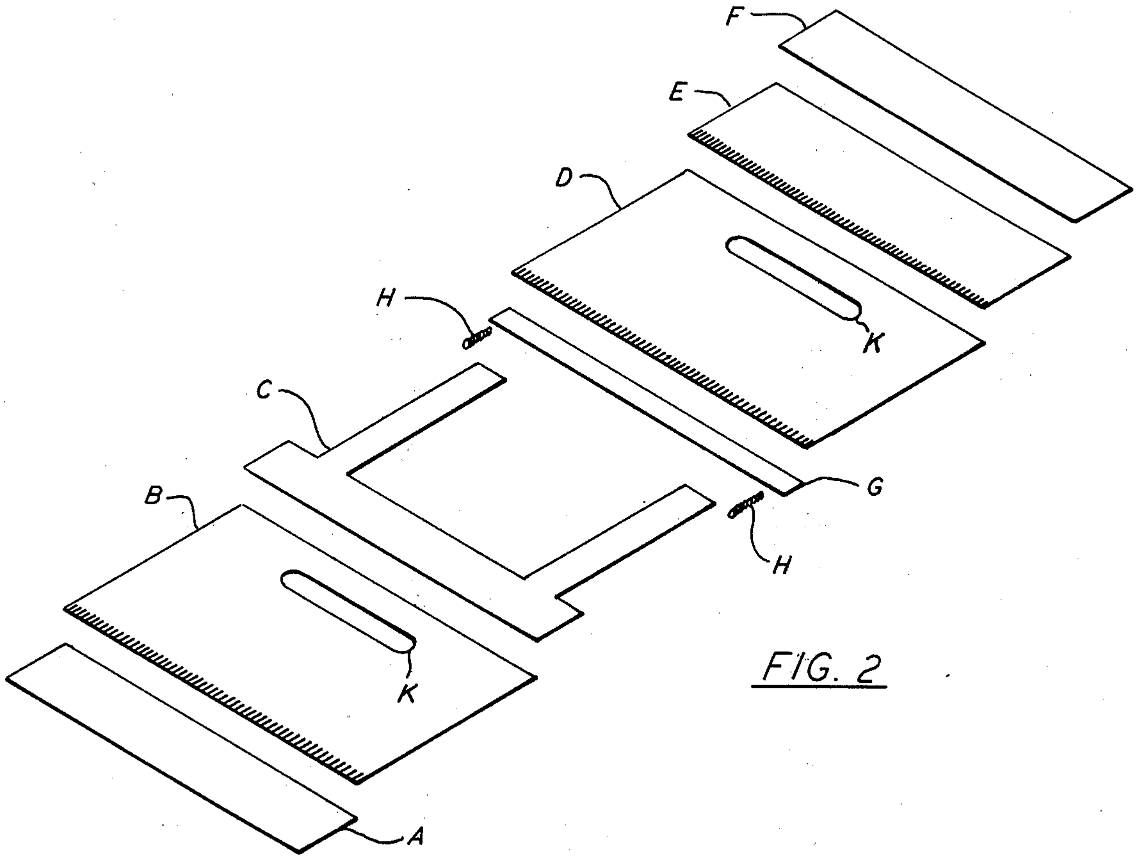
FIG. 2 is an exploded view of the component parts of the invention illustrated in FIG. 1.

An exploded view of the component parts of the tool of FIG. 1 is shown in FIG. 2. When assembled, the parts are aligned as shown in partial edge view, FIG. 3. The tool is of a size and shape such that its slotted end may be conveniently mated with a p.c. board connector. The slots are spaced along the edge of plates B and D in such a manner that when the tool is inserted into a p.c. board connector, the slots in the tool will be aligned with the polarizer-key grooves in the connector.

In constructing the tool, slide C is slideably affixed between slotted plated B and D. Slotted plates B and D are provided with openings K to permit the insertion of the fingers of the hand of the operator exercising the tool.

Slide C is provided with a handle bar G which extends outside the tool on the side opposite the slotted edges of plates B and D. Handle G is restrained from fixed contact with plates B and D by springs H which are fixedly constrained to bear on both handle G and the unslotted ends of plates B and D. Due to the action of springs H, slide C provides no interference with the slots in plates B & D until handle G is exercised so as to overcome the spring tension of springs H and cause slide C to move toward said slots.

Figure 3:
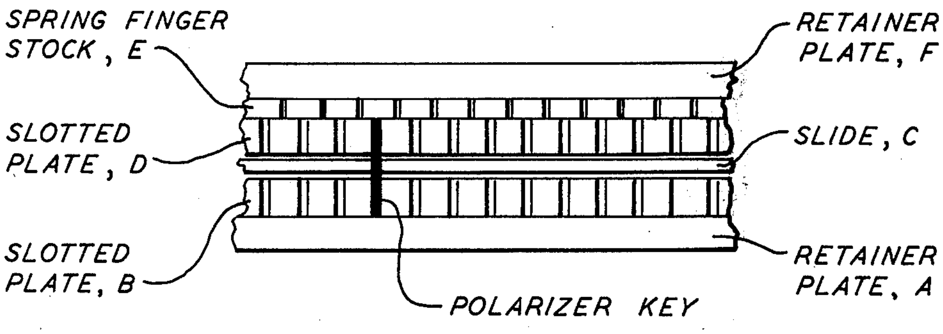
FIG. 3 gives a partial edge view showing alignment of slots and spring fingers.

The tool is designed to accept a polarizing key within the slots of plates B and D, shown in FIG. 3. So that said key will be slideably restrained within said slots, spring finger stock E and retainer plates A and F are utilized.

Spring finger stock E is mounted atop slotted plate D so that the spring fingers will bear slideably upon a polarizer key inserted in the slots of plate B and D. Restraining plate A, affixed to slotted plate B, provides a restraining surface upon which said polarizer key is slideably supported. Restraining plate F is mounted atop spring finger stock E so as to bear on said spring fingers so as to maintain spring tension on said polarizer key. Easy to read index number markings, in agreement with p.c. board groove locations, are provided on one or both of said restraining plates on the edge nearest said slots.

The tool is assembled sandwich-fashion as shown in FIGS. 1 and 3, all parts being firmly affixed with the exception of slide C and its handle H, slide C being slideably movable within the assembly. In operation, a polarizing key is inserted in one or more slotted locations as required. The key is restrained by plate A and retained by the spring pressure of finger-stock E. Operation of handle G advances slide C, ejecting the polarizing key from the tool and emplacing it in the desired location within a p.c. board connector that is mated with the tool.

Use of the invention has increased production while virtually reducing to zero the errror rate of polarized-key connector assembly operations.

A polarizer key insertion tool has been disclosed. It will be obvious to those skilled in the art that various changes and modifications may be made therein without departing from the invention. It is therefore intended to cover herein all such changes and modifications as fall within the true spirit and scope of the invention.

What is claimed is:

1. A method of inserting polarizing keys in printed circuit board connectors comprising the steps of:

inserting a polarizing key into an indexed location of a key inserting tool said indexed locations corresponding to polarizer key groove locations in a printed circuit board connector;

mating the key inserting tool with said printed circuit board connector to align said key with the desired location in said printed circuit board connector; and operating the key inserting tool to eject and emplace said key in the connector at the desired location.

2. Apparatus for inserting polarizer keys at desired locations within a printed circuit board receptacle connector comprising:

retaining means which holds a polarizer key at an indexed position corresponding to a desired polarizer key groove location in a printed circuit board connector preparatory to insertion of said key into said connector;

alignment means which aligns said polarizer key so held to the desired location in said connector at which the polarizer key is to be inserted, such alignment taking place when said retaining means is mated with said connector; and ejection means, which ejects the polarizer key from said retaining means and emplaces said key within said connector at the desired location.

3. A polarizer key insertion tool comprising:

a key retaining section which mates with a printed circuit board connector and aligns a polarizer key retained in said section with a desired polarizer key groove location within said connector; and an operating handle coupled to ejection means whereby operation of said handle causes said ejection means to eject said key from said tool and emplace said key at the desired location within said connector.

* * * * *